(12) United States Patent
Osborne

(10) Patent No.: US 7,492,274 B1
(45) Date of Patent: Feb. 17, 2009

(54) NOTIFICATION/ALERT MOTION FOR ELECTRONIC EQUIPMENT AND OR DEVICES

(76) Inventor: Morgan Kennedy Osborne, 1906 Haven Pl., Newport Beach, CA (US) 92663

( * ) Notice: Subject to any disclaimer, the term of this patent is extended or adjusted under 35 U.S.C. 154(b) by 337 days.

(21) Appl. No.: 11/433,169

(22) Filed: May 15, 2006

(51) Int. Cl.
*G08B 7/00* (2006.01)
(52) U.S. Cl. .................. 340/691.1; 340/691.7; 340/692; 340/693.9; 368/74; 368/204; 368/309; 84/94.1; 84/95.1
(58) Field of Classification Search .............. 340/691.1, 340/691.7, 692, 693.9; 368/74, 204, 309; 84/94.1, 95.1
See application file for complete search history.

(56) References Cited

U.S. PATENT DOCUMENTS 3,638,418 A * 2/1972 Spadini ........................ 368/74
6,300,548 B1 * 10/2001 Zhu et al. ..................... 84/94.1

* cited by examiner

*Primary Examiner*—Tai T Nguyen

(57) ABSTRACT

A motion producing motion-based notification/alert device to be used in and for attachment to mobile electronic equipment or devices, where the motion producing motion-based notification/alert device, upon receipt of an electronic signal from the mobile electronic equipment or device, reacts to set the mobile electronic equipment or device into various elevations and motions. The motion producing motion-based notification/alert device is designed to receive electronic signals from the mobile electronic equipment or device, whereby producing various motions resulting in the owner or user of the mobile electronic equipment or device being notified/alerted that the mobile electronic equipment or device has received an incoming signal or a desired event of the mobile electronic equipment or device has taken place. The motion producing motion-based notification/alert device includes a housing containing a power spring/electric motor which can be used in or attached to the mobile electronic equipment or device.

9 Claims, 4 Drawing Sheets

FIGURE-1A     FIGURE-1B

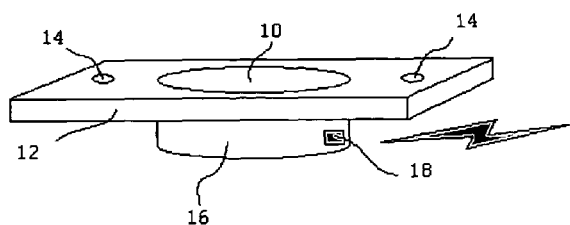
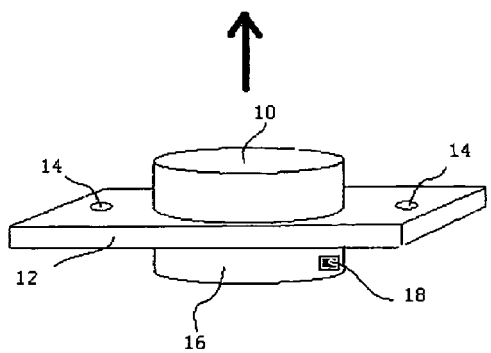
FIGURE 2GFIGURE 2H
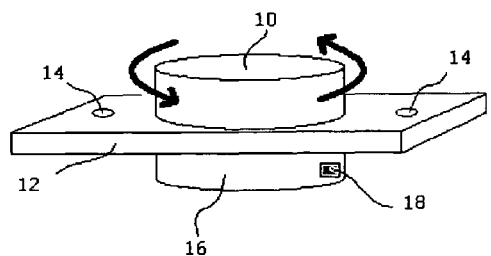
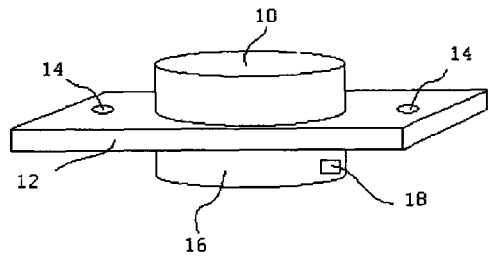
FIGURE 2IFIGURE 2J

NOTIFICATION/ALERT MOTION FOR ELECTRONIC EQUIPMENT AND OR DEVICES

CROSS-REFERENCE TO RELATED APPLICATIONS

None

FEDERALLY SPONSORED RESEARCH

None

SEQUENCE LISTING OR PROGRAM

None

BACKGROUND OF THE INVENTION

1. Field of Invention

This invention relates to all electronic equipment and or devices, specifically related to the alerting or notification of the/a desired event by delivery of an electronic charge to the invention thus setting the attached electronic equipment and or device into motion.

Such electronic equipment and or devices intended are, but not limited to, such: Cellular Phones, Cell-Phones, Cell Phone, Mobile Phones, Mobile Telephones, Telephones, Personal Digital Assistant, PDA's, Handheld PC, Handheld Devices, Personal Computers, Handheld Computers, Radio Telephone, Transmitters, Electronic Receivers, Pagers, Handheld Devices, Music Storage Devices, Music Players, Remote Controls, Calculators, etc.

2. Prior Art

Electronic equipment and or devices today have limited options in notifying or alerting attention to the individual owner/consumer and or equipment and or device. Such current options available today of notification or alerting are limited to: noise, vibration and light.

The current options available are limited and might/could/will/should/need/would not be the desired type of notification or alerting of certain individuals/consumers. This presents a major problem.

OBJECTS AND ADVANTAGES

Several objects and advantages of the present invention are:

(a) a solution to the above problem.

(b) to provide an alternative form of notification or alerting, namely: MOTION.

(c) to provide the owner/consumer a solution to the limited options available for notification or alerting from electronic equipment and or devices.

(d) to provide such invention in a manner that conserves electricity and is continuously reusable.

Still further objects and advantages will become apparent from a consideration of the ensuing description and drawings.

SUMMARY

A motion producing motion-based notification/alert device to be used in and for attachment to mobile electronic equipment or devices, which comprises a power spring/electric motor, housed properly, to be attached to the mobile electronic equipment or devices (mobile electronic devices in general) for alerting and or notification of a desired event through various elevations, actions and motions. The motion producing motion-based notification/alert device includes a housing for the power spring/electric motor which housing can be attached to the mobile electronic equipment or device. For example, the housing may or may not present screw holes for attachment purposes. The power spring/electric motor is one of the kind known in the art of springs and motors, and is installed in a manner allowing the rise and fall of the power spring/electric motor with respect to the mobile electronic equipment or device, to provide for various elevations, actions and motions of the attached mobile electronic equipment or device. The power spring/electric motor includes an electronic triggering mechanism which is activated upon receipt of a signal from the mobile electronic equipment or device. After each completed elevation, action or motion of the power spring/electric motor and attached mobile electronic equipment or device, the power spring/electric motor is rewound by manual power of the user or electric power of the power spring/electric device and attached mobile electronic equipment or device. Once the power spring/electric motor is rewound, the user depresses or the power spring/electric motor auto depresses the power spring/electric motor back into the housing for reuse for when the mobile electronic equipment or device receives the next signal and sends a signal to the electronic triggering mechanism of the power spring/electric motor.

The surface of the power spring/electric motor, which may be gripped by the user during rewinding of the power spring/electric motor, may be covered with a rubbery material for grip and traction or designed in various formats or materials. In addition, the housing of the power spring/electric motor is typically positioned for attachment under the center of gravity (or can be positioned under the off center of gravity) of the mobile electronic equipment or device to which it is attached. The motion of the power spring/electric motor may be manipulated by internal gear ratios, bearings and stops, for example, to produce a motion of the electrical equipment which is up, down, rotational, circular, bobbing back and forth, linear, dancing, marching, skipping, diagonal, fast or slow, unorthodox or smooth in fashion, for example.

In accordance with the above presented invention, a motion producing motion-based notification/alert device with a power spring/electric motor encased in the main housing that is to be use in and attached to mobile electronic equipment and or devices, that when the/a desired event occurs with the attached mobile electronic equipment or an electrical charge is sent to release the energy of the power spring/electric motor thus setting the attached object in various elevations, movements and motions resultingly alerting and or notifying the individual and or owner.

DRAWINGS

Figures

In the drawings, closely related figures have the same number but different alphabetical suffixes.

FIGS. 1A to 1D show various aspects/angles of the invention encased in it's plastic main housing and out of it's housing.

FIG. 2G is showing an electrical charge been delivered/sent to the electrical connection/trigger. (This will activate the power spring/motor.

FIG. 2H is showing the effect from FIG. 2G and sends the power spring/motor upward. (Release of energy)

FIG. 2I is showing the unwinding/untwisting of the power spring/motor. (Release of energy)

FIG. 2J is showing the invention in a state of non-tension or energy.

DRAWINGS

Reference Numerals

10—Power Spring/Motor
12—Housing
14—Screw Holes for Connection
16—Housing Storage for Power Spring/Motor
18—Electrical Connection/Trigger
20—Screws
30—Spring Barrel
32—Intermediate Gear
34—Governor
36—Winding Shaft
38—Turntable Spindle
40—Power Springs
42—Bearings Box
44—Up-Springs

DETAILED DESCRIPTION

Figure 1C:
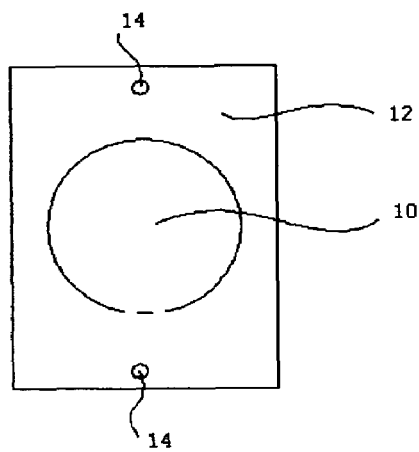
Figure 1C:
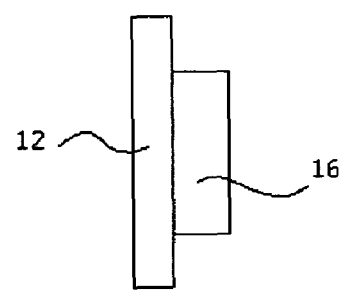
Figure 1C:
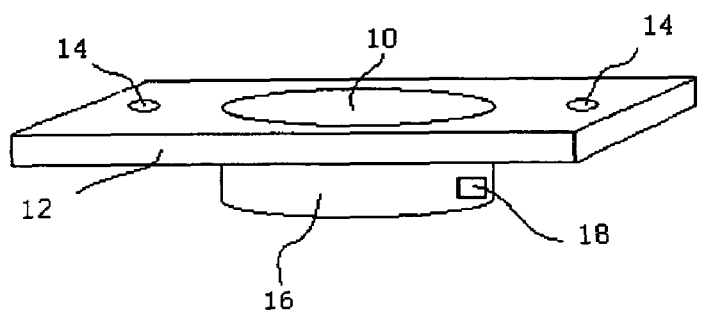
Figure 1D:
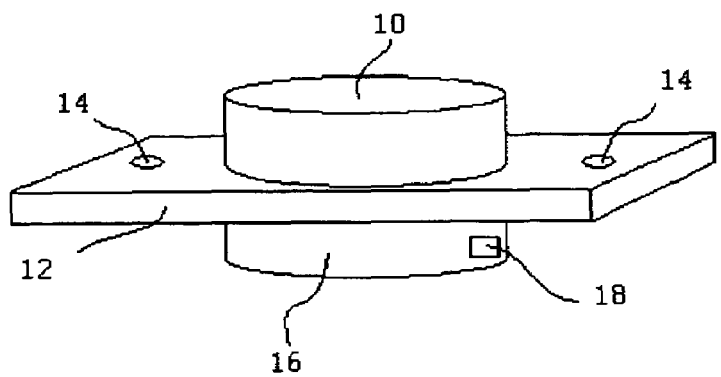

FIGS. 1A and 1B—Preferred Embodiment

A preferred embodiment of the invention is illustrated in FIGS. 1A to 1D & 3A. The invention has a thin housing (12) made of plastic necessary to hold/store/house the power spring/motor (10) and attach itself to electrical equipment/object and or devices using the screw holes (14) to be secured by screws.

When properly secured to the intended object, the invention is flush with it's surroundings. When set on the ground (with power spring/motor stored) it will lay flat.

The top of the power spring/motor (10) is to be covered with a rubbery material as to provide grip when invention is in it's active mode of spinning.

The housing storage for power spring/motor (16) has an entrance/location for the electrical connect/trigger (18) as to where the invention is electrically connected to the electrical equipment and or device/object.

OPERATION

FIGS. 2A, 2B, 2C, 2D, 2E, 2f, 2G, 2H, 2I, 2J, 3A & 4A

Figure 2A:
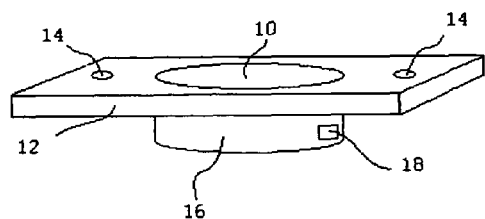
FIG. 2A is showing the invention with the power spring/motor stored in it's housing storage location.
Figure 2B:
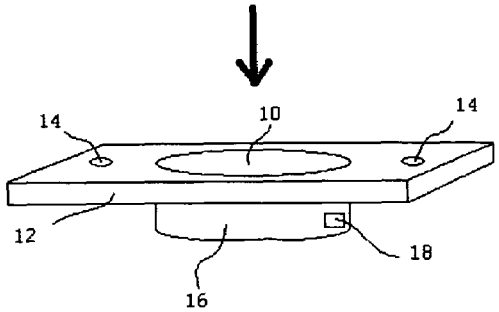
FIG. 2B is showing the pushing down of the power spring/motor.
Figure 2C:
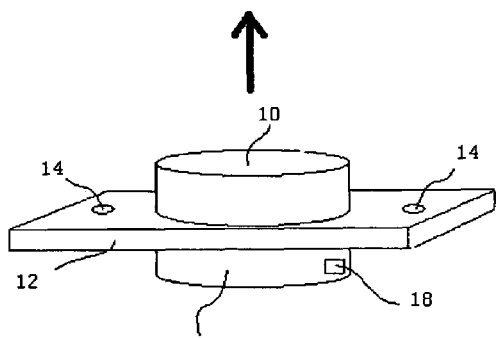
FIG. 2C is showing the result/effect of the action taken in FIG. 2B. (The power spring/motor pushes upward out of the housing spring/motor storage)
Figure 2D:
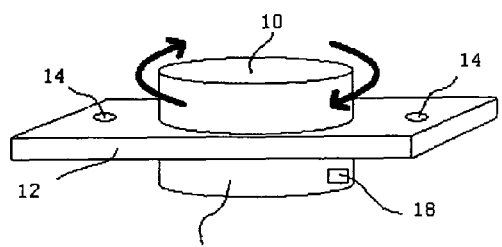
FIG. 2D is showing the twisting/winding of the power spring/motor. This is done until power spring/motor is fully twisted/wound.
Figure 2E:
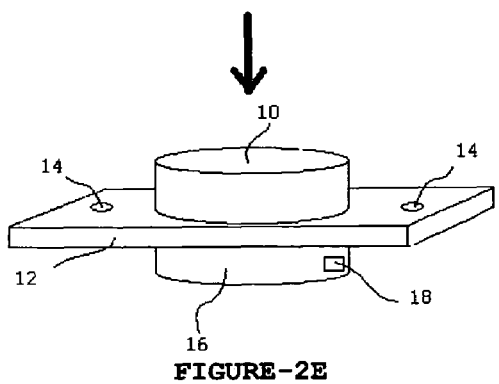
FIG. 2E is showing the pushing down of the power spring/motor after 2D has been completed.

After being properly attached to the equipment/object/ and or device, then as FIG. 2A is shown for initial stages of understanding, One first releases the power spring/motor (FIG. 2B) by pushing down and allowing (FIG. 2C) the power spring/motor to push up/open. This gives the user the opportunity to wind/twist (FIG. 2D) the power spring/motor and transferring ones personal energy to that of the power spring/motor. After reaching the maximum capacity of the twisting/winding motion one locks the power spring/motor into it's housing storage as displayed in FIG. 2E.

Figure 2F:
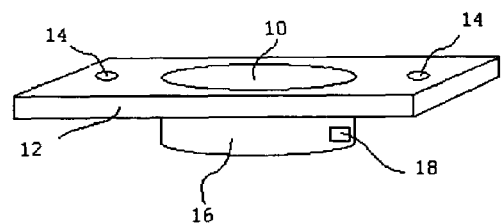
FIG. 2F is showing the power spring/motor in it's state of readiness ready for delivery of an electrical charge.
Figure 3A:
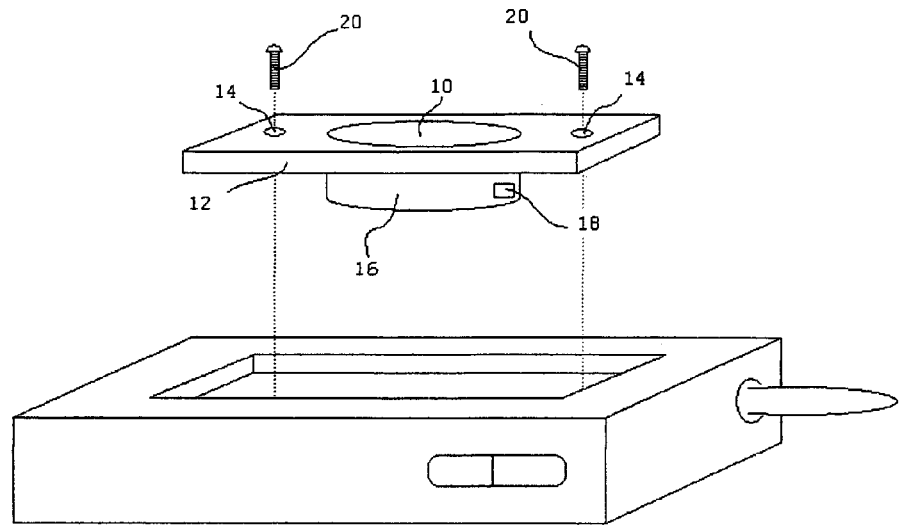
FIG. 3A is an example showing screws to be inserted for attachment purposes.
Figure 4A:
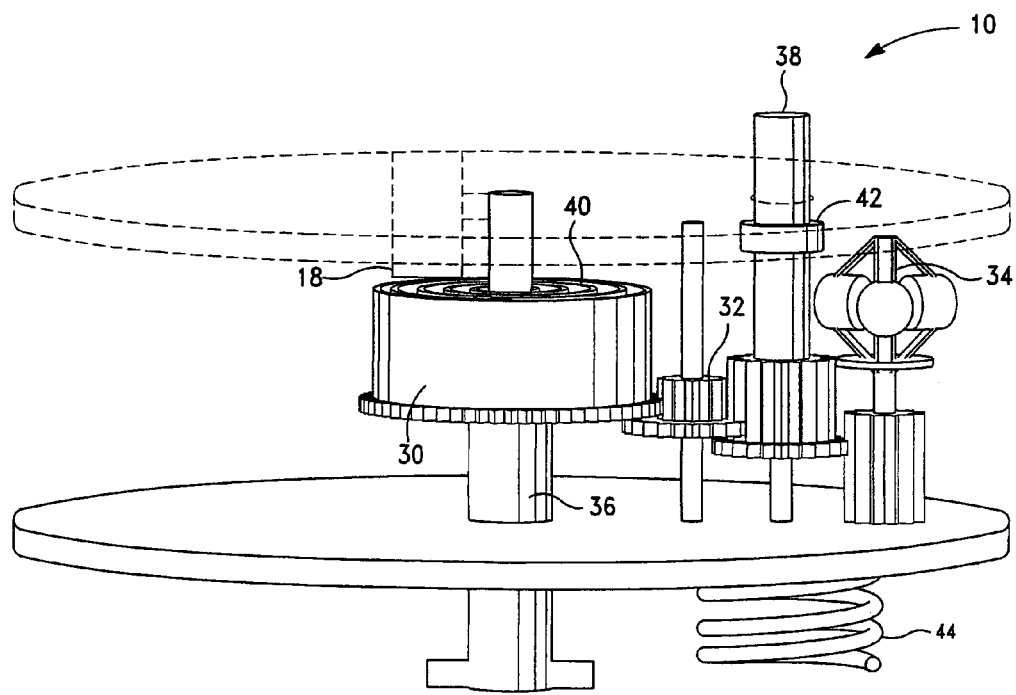
FIG. 4A is showing the internal configuration of reference numeral 10, the power spring/motor.

At this moment in the process, the invention and it's motor is active and ready with energy. FIG. 2F shows this. It is waiting to be triggered by an electrical current.

"Zap" An event has occurred, and electricity has been sent to the electrical connection/trigger. FIG. 2G shows such event, and this now starts a chain of events that will release all the stored energy.

First it releases the power spring motor (which elevates the attached object from its resting service), FIG. 2H.

Second, it begins the unwinding/twisting motion (FIG. 2I) stored in the power spring/motor. Since the object attached to the invention has been elevated, the object begins to spin. This notifies and or alerts the owner/consumer that something triggered the electrical connector/trigger and the attached object. An example of this could be the phone ringing, or the completion of a count down of a clock, or the alarm of certain time that was set, appointment reminder, etc. There are multitudes of reasons.

Lastly, once all the energy has been released from the power spring/motor through its spinning of the object, internal bearings allow the object to use its kinetic energy to continue to spin until it comes to a rest, FIG. 2J.

The process/operation is thus repeated by beginning back at 2D and completing steps 2D & 2E. This allows the cycle to begin again.

The preferred attachment for 3A showing the power spring and housing being attached to the backside of the electronic equipment or device where the electronic equipment or device has a recessed area for a interlock attachment. The screw holes allow a firm attachment whereby creating a level/flush surface with the attached.

The side showing of 4A has a winding shaft (36) for the winding of the power springs (40) which are contained by a spring barrel (30) which hold the power springs (40). The electrical connection/trigger (18) is connected to the attached electrical equipment or device and the winding shaft (36) whereby when an event of the attached electrical equipment or device takes place a signal is sent to the electrical connection/trigger releasing the up-springs (44) and winding shaft (36) and its stored energy to produce motion from the power springs (40) which winding shaft is also connected to the intermediate gear (32) which is connected to the turntable spindle (38) which is connected to the governor (34) which regulates the desired speed of revolution, additionally the turntable spindle (38) is attached to the electronic equipment or device whereby the end result sends the attached electronic equipment or device into motion whereby upon release of all energy from the power springs the kinetic energy is continued by the bearings box (42) allowing for the motion to continue until rest. All elements are located in the housing (12) for the invention.

(It is important for the reader to understand that when flipped over the figures shown are in action and motion opposite of that shown).

ADVANTAGES

From the description above, a number of advantages of my invention become apparent:

(a) a better way to notify an owner of an electrical object, device or equipment, of the fact that a certain event effecting that electrical object, device or equipment has occurred or will occur.

(b) polite way of notification that will simply ask the individual if they want to answer the phone rather that have to act because of the noise made by all the other options available today.

(c) unique and more advanced way of notification, and communication between electrical objects, devices or equipment.

(d) the presence of such a product will revolutionize how we interact with our daily electrical objects.

(e) it is a more polite way of realizing an event in the eye of the public and ones surroundings.

(f) it will provide an option that is currently not available today, and a solution to many circumstances.

CONCLUSION, RAMIFICATION AND SCOPE

Accordingly, the reader will see that the motion device of this invention can be used in a multitude of electronic equipment and or devices, and will become a boon to the end individual/owner/consumer/electronic equipment and or device industry.

Although the description above contains many specifications, these should not be construed as limiting the scope of the invention but as merely providing illustrations of some of the presently preferred embodiments of this invention. For example, the motion device housing can have other shapes, such as circular, oval, trapezoidal, triangular, or be made of wood, metal, plastic, etc.; the connecting screws can be positioned in different locations; the electrical connector can be located in a different area; the power spring can be a fully electrical motor as well, etc.

Thus the scope of the invention should be determined by the appended claims and their legal equivalents, rather than by examples given.

I claim:

1. A motion producing motion-based notification/alert device to use and attach with a mobile electronic equipment or devices, said motion producing motion-based notification/alert device comprising:

a) a power spring/electric motor for use in combination with the attached mobile electronic equipment or device for alerting and notification of a desired event of the attached mobile electronic equipment or device through motion of the attached mobile electronic equipment or device through various movement and motion;

b) a housing for the power spring/electric motor which is attached to the mobile electronic equipment or device and which enables the power spring/electric motor to act to produce a specific motion of the attached mobile electronic equipment or device, wherein a speed regulation means is connected to the power spring/electric motor allowing for regulation of motion speed upon receive of energy from the power spring/electric motor; and c) a electronic triggering mechanism in communication with the power spring/electric motor and attached mobile electronic equipment or device, whereby said power spring/electric motor is activated upon receipt of a signal from said mobile electronic equipment or device, whereby the attached mobile electronic equipment or device is elevated and set into motion.

2. A motion producing motion-based notification/alert device in accordance with claim 1, wherein, after completion of a notification cycle, the power spring/electric motor may be reset by manual or electric rewinding by a user of the motion producing motion-based notification/alert device or attached mobile electronic equipment or device.

3. A motion producing motion-based notification/alert device in accordance with claim 2, wherein the housing is configured so that the power spring/electric motor is depressed back into the housing subsequent to rewinding or use.

4. A motion producing motion-based notification/alert device in accordance with claim 1, wherein the surface of the housing or power spring/electric motor which can be gripped by a user during rewinding is covered with or being a part of the group consisting of: a rubbery material; hard or soft material; grooved pattern; ergonomic design; odd shaped; and any combinations thereof.

5. A motion producing motion-based notification/alert device in accordance with claim 1, wherein the housing of the power spring/electric motor is positioned for attachment under a center of gravity or off-center of gravity of the mobile electronic equipment or device to which it is attached.

6. A motion producing motion-based notification/alert device in accordance with claim 1, wherein the power spring/electric motor is manipulated by internal gear ratios, bearings and stops, to produce a particular motion of the attached mobile electronic equipment or device.

7. A motion producing motion-based notification/alert device in accordance with claim 6, wherein said particular motion is selected from the group consisting of: up and down; rotational; circular; bobbing back and forth; rising and falling; linear; diagonal; walking; stepping; marching; spinning; popping; twisting; rolling; dancing; and combinations thereof.

8. A motion producing motion-based notification/alert device in accordance with claim 7, wherein said power spring/electric motor is configured to provide a motion which is fast or slow.

9. A motion producing motion-based notification/alert device in accordance with claim 7, wherein said power spring/electric motor is configured to provide a motion is unorthodox, intermittent or smooth in operation.

* * * * *